United States Patent
Johnston et al.

(10) Patent No.: US 12,481,963 B2
(45) Date of Patent: Nov. 25, 2025

(54) PROACTIVE SCHEDULING OF SHARED RESOURCES OR RESPONSIBILITIES

(71) Applicant: Cisco Technology, Inc., San Jose, CA (US)

(72) Inventors: Jay K. Johnston, Raleigh, NC (US); Magnus Mortensen, Cary, NC (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 144 days.

(21) Appl. No.: 17/973,688

(22) Filed: Oct. 26, 2022

(65) Prior Publication Data

US 2024/0144193 A1    May 2, 2024

(51) Int. Cl.
*G06Q 10/0631*    (2023.01)
*G06Q 10/1093*    (2023.01)

(52) U.S. Cl.
CPC ... *G06Q 10/1095* (2013.01); *G06Q 10/06314* (2013.01)

(58) Field of Classification Search
None
See application file for complete search history.

(56) References Cited

U.S. PATENT DOCUMENTS

| | | | |
|---|---|---|---|
| 9,626,660 B2 | 4/2017 | Bathiya | |
| 2012/0150581 A1 | 6/2012 | McPhail | |
| 2017/0147950 A1* | 5/2017 | Carbonell | G06Q 10/02 |
| 2017/0316386 A1 | 11/2017 | Joshi et al. | |
| 2019/0130365 A1* | 5/2019 | Pell | G06Q 10/1095 |
| 2020/0118045 A1 | 4/2020 | Chung et al. | |
| 2021/0374686 A1 | 12/2021 | Worth | |
| 2023/0410005 A1* | 12/2023 | Gambhir | G06Q 10/02 |

FOREIGN PATENT DOCUMENTS

WO    WO-2013056359 A1 *    4/2013    ........... G06Q 10/109

OTHER PUBLICATIONS

Yang, Min, and Yuanyuan Yang. "An efficient hybrid peer-to-peer system for distributed data sharing." IEEE Transactions on computers 59.9 (2009), pp. 1158-1171. (Year: 2009).*

(Continued)

*Primary Examiner* — Amanda Gurski
(74) *Attorney, Agent, or Firm* — Edell, Shapiro & Finnan, LLC

(57) ABSTRACT

Presented herein are techniques associated with proactively scheduling shared resources or responsibilities among multiple users. In one example a method is provided that may include sharing masked calendar information between a first device of a first user and at least one second device of at least one second user based on the first device being proximate to the at least one second device; identifying a conflict involving use of a shared resource at a particular time; comparing first priority metadata for the first user and second priority metadata for the at least one second user; and assigning the use of the shared resource to one of the first user or the at least one second user based, at least in part, on determining that the first user or the at least one second user has a highest priority for use of the shared resource.

20 Claims, 5 Drawing Sheets

(56) References Cited

OTHER PUBLICATIONS

Lakach, S., "How To Create A Family Calendar On Google," MashableIndia, https://in.mashable.com/tech/20886/how-to-create-a-family-calendar-on-google, Mar. 15, 2021, 3 pages.
Workspace Tips, Mashable India, "How to share your Google Calendar with others," https://workspacetips.io/tips/calendar/how-to-share-your-google-calendar-with-others/, retrieved Jul. 30, 2022, 2 pages.
Microsoft, "Share an Outlook calendar with other people," https://support.microsoft.com/en-us/office/share-an-outlook-calendar-with-other-people-353ed2c1-3ec5-449d-8c73-6931a0adab88, retrieved Aug. 3, 2022, 6 pages.
Microsoft 365 Admin, Microsoft Learn, Article, "Share Microsoft 365 calendars with external users," https://learn.microsoft.com/en-us/microsoft-365/admin/manage/share-calendars-with-external-users?view=o365-worldwide, Oct. 20, 2022, 2 pages.

\* cited by examiner

PROACTIVE SCHEDULING OF SHARED RESOURCES OR RESPONSIBILITIES

TECHNICAL FIELD

The present disclosure relates to network equipment and services.

BACKGROUND

In hybrid work environments, a large portion of an employee's time might be spent working from their home, away from the office of their employer. Often, such a 'remote' employee will be working in a home environment that involves physical space that is shared with other people (e.g., a spouse, roommates, etc.) such that scheduling use of a particular shared physical space (e.g., a home office area/room) for attending an online meeting can be challenging.

DETAILED DESCRIPTION

Overview

Figure 1A:
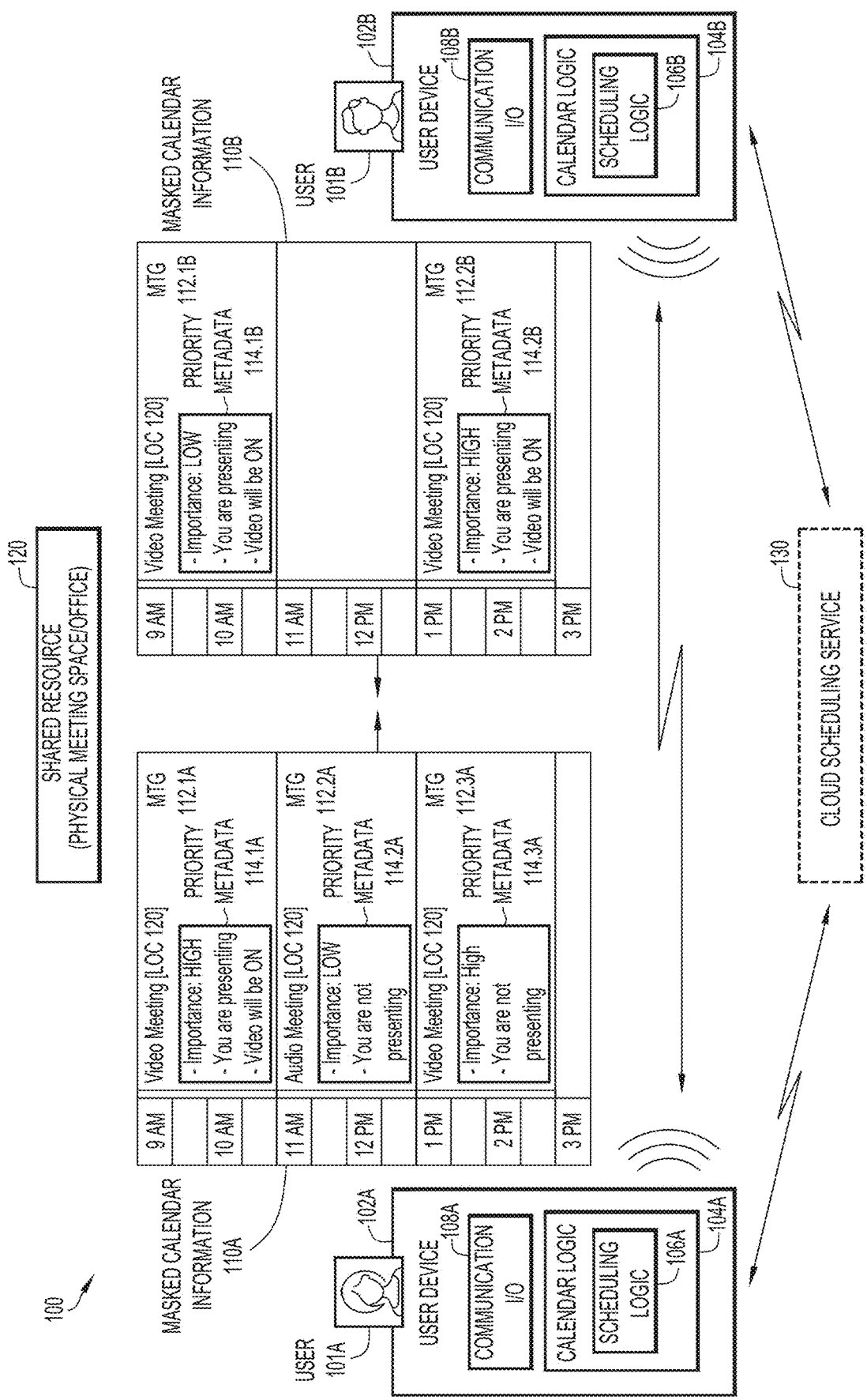
FIG. 1A is a diagram of a system in which techniques that facilitate proactive scheduling of shared resources or responsibilities among multiple users may be implemented, according to an example embodiment.

Techniques presented herein may be associated with helping people (that potentially may work at different companies) to efficiently use a shared resource, such as a shared workspace (e.g., a home office, a co-working meeting room). In particular, techniques herein provide for the ability for at least two people to view each other's "masked" calendars for a given time period (e.g., a day, week, etc.) and then automatically suggest who should use or be assigned to use the shared resource (e.g., meeting space) during specific times of the day based on various priority metadata associated with each person's planned use for the shared resource. For example, if each person is to use a shared meeting space at given time, priority metadata for each person's meeting may indicate any combination of, an importance of each person's meeting, if a particular person is to talk or is scheduled to present during their meeting, if a particular person is using video during their meeting, etc. Such techniques for determining use of a shared resource can also be extended to provide for the ability to determine a person that should accept a shared responsibility or task (e.g., pick a child up from school) considering their work schedule/priority metadata associated with their schedule.

In at least one embodiment, a computer-implemented method is provided that may include sharing, via network communications, masked calendar information between a first device of a first user and at least one second device of at least one second user based on the first device being proximate to the at least one second device; identifying, based on the masked calendar information, a conflict involving use of a shared resource at a particular time by the first user and the at least one second user, wherein first priority metadata for the first user and second priority metadata for the at least one second user associated with the use of the shared resource are included in the masked calendar information; comparing the first priority metadata for the first user and the second priority metadata for the at least one second user to determine whether the first user or the at least one second user has a highest priority for use of the shared resource; and assigning the use of the shared resource to one of the first user or the at least one second user based, at least in part, on determining that one of the first user or the at least one second user has the highest priority for the use of the shared resource.

EXAMPLE EMBODIMENTS

In a hybrid work environment, much of an employee's time might be spent working from their home or otherwise away from their employer's office. Often, such a 'remote' employee will be working from a home environment and sharing a physical space alongside a spouse, roommates, or the like such that each person in the environment will need to schedule around each other to have access to the office for work important meetings.

For example, consider a couple living in an apartment that has one "office" room shared by both of them, with two desks with computer setups. It is the preferred place in the home for both of them to take video conference meetings, but both of them can't be on active meetings and speaking at the same time due to their close proximity to each other. Often the conversation in this scenario involves a question, such as "What kind of meetings do you have today? I have to talk in my meeting from 10-to-11, but for the rest of the day I'm just working on things, when are your talking meetings?" The two people must "juggle" their different meetings in the shared room, and constantly check with each other if the next meeting requires active participation (talking) in which case one of them must leave.

Another problem can occur when a couple has young children and must negotiate family tasks during the workday, such as getting the kids ready, taking the kids to school, picking them up, etc. In this case the tasks that need to be done can be considered a shared responsibility or task that is akin to a shared resource in that the shared task occupies the time one or more of the people in the same hybrid work environment and that needs to be coordinated ahead of time. Accordingly, it would be useful to provide computer-implemented method or technique to automatically assign and inform members of the same area (e.g., a household, etc.) of the calendar of meetings each person has, what type of meetings they are and how shared resources and responsibilities will be handled between the persons.

In accordance with embodiments herein, techniques are provided through which people (that potentially may work at different companies) can efficiently use a shared resource, such as a shared workspace (e.g., a home office, a co-working meeting room). In particular, techniques herein provide for the ability for at least two people to view each other's "masked" calendars for a given time period (e.g., a day, week, etc.) and then automatically suggest who should use or be assigned to use the shared resource (e.g., meeting space) during specific times of the day based on various priority metadata associated with each person's planned use for the shared resource.

For example, if each person is to use a shared meeting space at given time, priority metadata for each person's meeting may indicate any combination of, an importance of each person's meeting, if a particular person is to talk or is scheduled to present during their meeting, if a particular person is using video during their meeting, etc. Such techniques for determining use of a shared resource can also be extended to provide for the ability to determine a person that should accept a shared responsibility, also referred to herein interchangeably as a shared task, (e.g., take a child to tutoring) considering their work schedule/priority metadata associated with their schedule.

Figure 1B:
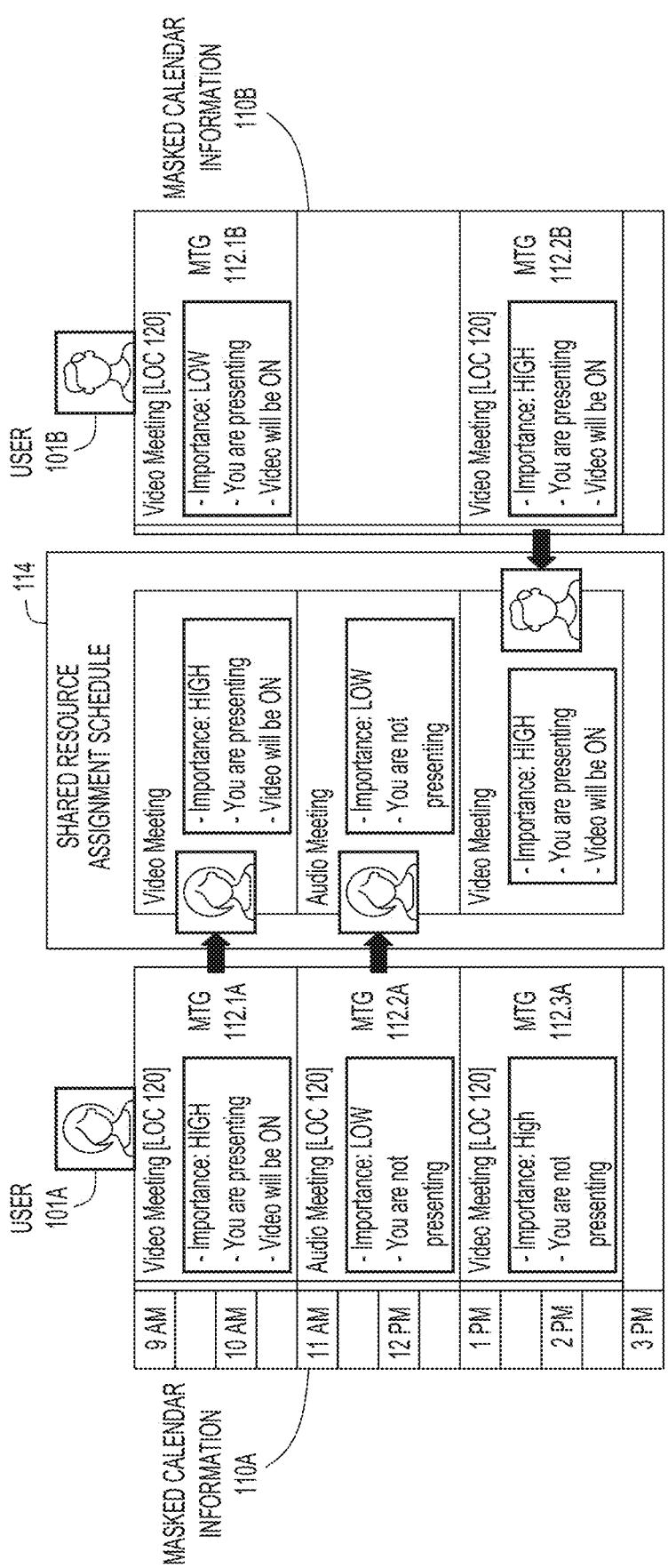
FIG. 1B is a diagram illustrating example details associated with providing proactive scheduling between at least two users utilizing the system of FIG. 1A in order to assign use a shared resource to one of the users, according to an example embodiment.

Referring to FIG. 1A, FIG. 1A is a block diagram of a system 100 in which techniques that facilitate proactive scheduling of shared resources or responsibilities among multiple users may be implemented, according to an example embodiment. FIG. 1B is a diagram illustrating example details associated with providing proactive scheduling between at least two users utilizing the system 100 of FIG. 1A in order to assign use a shared resource to one of the users, according to an example embodiment, and will be discussed with reference to FIG. 1A.

The system 100 may include at least two user devices 102A and 102B, each associated with a corresponding user (person) 101A and 101B. Each user device 102A/102B may be associated with any person, user, subscriber, employee, client, customer, and may be inclusive of any device that initiates a communication in the system, such as a computer, a laptop or electronic notebook, a cellular/Wi-Fi enabled telephone/smart phone, tablet, etc. and/or any other device, component, element, or object capable of initiating voice, audio, video, media, or data exchanges within system 100.

Each user device 102A/102B may include corresponding calendar logic 104A/104B that can be configured with corresponding scheduling logic 106A/106B. For example, user device 102A may include calendar logic 104A that can be configured with corresponding scheduling logic 106A and user device 102B may include corresponding calendar logic 104B that can be configured with scheduling logic 106B. Each user device 102A/102B may include corresponding communication input/output (I/O) interface(s), referred to herein as corresponding communication I/O 108A/108B, each of which may include any combination of hardware (e.g., communications units, receiver(s), transmitter(s), antenna(s) and/or antenna array(s), processor(s), memory element(s), baseband processor(s) (modems), etc.), controllers (e.g., wireless local area network controllers, wired network controllers, etc.), software, logic, and/or any other elements/logic that may facilitate wireless and/or wired communications and/or connections among one or more elements of system 100. It is to be understood that each user device 102A/102B may include/be configured with any other hardware, software, operating system, I/O interfaces, processor(s), memory element(s), storage, etc. to facilitate/interface with one or more displays, keyboards, microphones, speakers, etc.

Various examples discussed herein involve wireless network communications being exchanged between user device 102A and user device 102B, however, it is to be understood that network communications exchanged between user device 102A and 102B can be facilitated via any combination of wireless and/or wired network communications.

In accordance with embodiments herein, calendar logic 104A/104B may be implemented as any calendaring application that may be configured, installed, and/or otherwise operative via corresponding user devices 102A/102B. In accordance with embodiments herein, corresponding scheduling logic 106A/106B may be configured to operate in association with corresponding calendar logic 104A/104B for each user device 102A/102B in order to facilitate various operations described herein through which proactive scheduling of a shared resource and/or responsibility can be provided among multiple user devices, such as user devices 102A/102B. In some embodiments, each user device 102A/102B can communicate with a cloud scheduling service 130, which may provide proactive scheduling of a shared resource and/or responsibility for multiple user devices, such as user devices 102A/102B. Although only two user devices 102A and 102B are illustrated in FIG. 1A, it is to be understood that embodiments herein may be utilized to facilitate proactive scheduling of shared resources or responsibilities among multiple users.

Also shown in FIG. 1A is an example shared resource 120, which may be considered a physical meeting space, office, etc. that is shared by users 102A/102B. For various examples discussed herein, shared resource 120 may be characterized as a physical shared meeting space or office located at a given location, which can be referred to herein using the label: '[LOC 120]'.

Broadly, operations facilitated via system 100 that provide for proactive scheduling of a shared resource and/or responsibility may include, but not be limited to, (I) sharing a masked calendar within a local proximity of at least two users/user devices (e.g., "my partner and I need to see each other's work schedules for tomorrow"), (II) identifying and resolving scheduling for a shared resource (e.g., "my partner and I need to work out who will get the shared office for our important meetings tomorrow morning") in order to assign the shared resource to a particular user, and/or, in some instances (III) identifying and resolving scheduling for a shared task, which is considered to be a time sensitive task (e.g., "my wife and I need to ensure someone picks up the kids from school at 3 PM, considering our work calendars and who has the most important meetings during that time") in order to assign the shared resource to a particular user.

Consider various operations that may be associated with (I) sharing a masked calendar between at least two users/user devices within a local proximity with each other. When a feature provided by embodiments herein is enabled for a user device, for example, enabled via a calendar/scheduling setting configured or otherwise set/enabled for calendar logic/scheduling logic 104A/106A of user device 102A and 104B/106B of user device 102B, user devices 102A/102B, which could be used for work involving two different companies but in the same local proximity of each, can broadcast their basic "masked" calendar availability information so that others nearby can receive, it, view it, and logic configured for each user device 102A/102B can compare the received masked calendar information against their own calendar information. Only certain (e.g., non-confidential/non-sensitive) calendar information is shared while confidential/sensitive corporate and/or personal information is "masked" or otherwise omitted/obfuscated in order to prevent sensitive/confidential corporate and/or personal information leakage between multiple users/parties.

For example, as shown in FIG. 1A, user device 102A can share or transmit (e.g., via any combination of wireless and/or wired peer-to-peer (P2P) network communications facilitated via communication I/O 108A) masked calendar information 110A with user device 102B, which can receive the masked calendar information 110A for processing in accordance with embodiments herein via calendar/scheduling logic 104B/106B. Similarly, user device 102B can share or transmit (e.g., via wireless/wired P2P network communications facilitated via communication I/O 108B) masked calendar information 110B with user device 102A, which can receive the masked calendar information 110B for processing in accordance with embodiments herein via calendar/scheduling logic 104A/106A. Thus, a P2P exchange can be performed to share masked calendar information among multiple user devices that are in local proximity to each other.

Masked calendar information 110A/110B shared between user devices 102A/102B can include meeting information and/or shared task information. For example, meeting information and/or shared task information that is shared between user devices 102A/102B may include information, also referred to herein as priority metadata, that can be used to resolve conflicts involving use of a shared resource, such as shared resource 120 (e.g., a shared meeting space at [LOC 120]) and/or a shared task. In various embodiments, different types of priority metadata can be configured for meetings, such as, time and duration of meeting(s), user role during meeting(s) (e.g., presenter/non-presenter, listener, etc.), meeting attendance requested (e.g., required attendee or optional attendee), meeting importance (e.g., meeting with a boss, client, etc. versus a touch-base with a co-worker) in which meeting importance could potentially be scaled (e.g., 1-5) or otherwise indicated using any flag, etc., video status for meeting(s) (e.g., video is/is not to be used for a meeting), microphone status for meeting(s) (e.g., speaking or listening-only), combinations thereof, and/or the like.

FIG. 1A this illustrates portions of masked calendars for two different household members, user 101A and user 101B, in which masked calendar information 110A and 110B shared between the users includes priority metadata for each of a number of meetings that are to be attended by each of the users (e.g., meeting importance, if the person is presenting, if video will be on for the meeting, etc.).

For example, masked calendar information 110A shared/transmitted to user device 102B by user device 102A for user 101A identifies three meetings that are to be attended by user 101A for a given day, such that a meeting (MTG) 112.1A is scheduled between 9 AM and 11 AM, is to use the shared resource 120 [LOC 120], and includes priority metadata 114.1A indicating that the meeting 112.1A is a video meeting (e.g., video status is set to 'ON'), has a meeting importance of 'HIGH', and indicates that user 101A will be presenting during the meeting 112.1A (e.g., user role is set to 'PRESENTER' and/or microphone status is set to 'ON'). The masked calendar information 110A further identifies a meeting 112.2A is scheduled between 11 AM and 1 PM, is to use the shared resource 120 [LOC 120], and includes priority metadata 114.2A indicating that the meeting 112.2A is an audio-only meeting (e.g., video status is set to 'OFF' or the priority metadata does not include any video status information, such that the meeting is interpreted by calendar/scheduling logic to be an audio-only meeting), has a meeting importance of 'LOW', and indicates that user 101A will not be presenting during the meeting 112.2A (e.g., user role is set to 'NON-PRESENTER' and/or microphone status is set to 'OFF'). The masked calendar information 110A further identifies a meeting 112.3A is scheduled between 1 PM and 3 PM, is to use the shared resource 120 [LOC 120], and includes priority metadata 114.3A indicating that the meeting is a video meeting (e.g., video status is set to 'ON'), has a meeting importance of 'HIGH', and indicates that user 101A will not be presenting during the meeting 112.3A (e.g., user role is set to 'NON-PRESENTER' and/or microphone status is set to 'OFF').

Similarly, masked calendar information 110B shared/transmitted to user device 102A by user device 102B for user 101B identifies two meeting that are to be attended by user 101B for the given day, such that a meeting 112.1B is scheduled between 9 AM and 11 AM, is to use the shared resource 120 [LOC 120], and includes priority metadata 114.1B indicating that the meeting 112.1B is a video meeting (e.g., video status is set to 'ON'), has a meeting importance of 'LOW', and indicates that user 101A will be presenting during the meeting 112.1A (e.g., user role is set to 'PRESENTER' and/or microphone status is set to 'ON'). The masked calendar information further identifies a meeting 112.2B is scheduled between 1 PM and 3 PM, is to use the shared resource 120 [LOC 120] and includes priority metadata 114.2B indicating that the meeting 112.2B is a video meeting (e.g., video status is set to 'ON'), has a meeting importance of 'HIGH', and indicates that user 101A will be presenting during the meeting 112.1A (e.g., user role is set to 'PRESENTER' and/or microphone status is set to 'ON').

As illustrated in FIG. 1A, sharing the masked meeting information allows people in local proximity to each other (e.g., the same house, etc.) to easily understand when their other family members, roommates, etc. are going to be busy during the day and when their meetings might overlap. Sharing masked calendar information between multiple user devices based on the proximity or distance between the user devices can be facilitated through a variety of techniques that facilitate sharing between user devices as long as they are in the same proximity (e.g., separated by a short distance, in local communication with each other, etc.)

For example, in some embodiments, a list of 'sync-able' parties/users/user devices with which masked calendar information is to be shared can be manually controlled/configured by a user for a user device, can be set to be shared with a list of contacts, and/or the like. This may be useful for instances in which the shared resource 120 is a location that is in an area with multiple tenants or elevated density (e.g., an apartment building, adjacent townhomes, etc.).

Given that this type of contention involving a shared resource/meeting space is typically related to those sharing a physical space, wireless communication technologies such as ultrasonic communication and/or near field communication (NFC) technologies can be leveraged in some embodiments to achieve the 'proximity' communication without crossing typical domicile boundaries (e.g., walls and floors).

To provide privacy and security in order to ensure that masked calendar information is only shared with an intended person, some embodiments for sharing masked calendar information can include sharing a pass-phrase challenge between user devices 102A and 102B prior to sharing masked calendar information 110A/110B, sharing a quick response (QR) code with a given user device 102A/102B in order to authenticate the other user device 102A/102B to transmit/receive masked calendar information 110A/110B, exchanging validation keys between user devices 102A/102B, combinations thereof, and/or the like.

Next, consider various operations that may be associated with identifying and resolving scheduling conflicts for the use of shared resource 120 by assigning use of the shared resource 120 for a given meeting/meeting time.

In various embodiments, conflict resolution for assigning use of a shared resource (e.g., a physical meeting space/office), such as shared resource 120, to one of users 101A or 101B can be performed separately by calendar/scheduling logic 104A/106A and 104B/106B configured for each of user device 102A/102B (assuming the logic is configured in a same way for each user device 102A/102B in order to arrive at the same conflict resolution by each user device 102A/102B), could be performed by the logic configured for one of the user devices 102A/102B and then assignment(s) could be communicated to the other user device 102A/102B, or could be performed by cloud scheduling service 130 in which masked calendar information shared among user devices 102A/102B could be shared with cloud scheduling service 130 (in addition to and/or in lieu of sharing such information among user devices 102A/102B) in which the cloud scheduling service 130 communicates assignment(s) to user devices 102A and 102B.

As noted above, priority metadata can be included in masked calendar information for each meeting that is to be attended by each user 101A/101B. In some embodiments, the members of a household, users of a shared resource, etc. can mark their meetings with priority metadata that helps to automatically resolve conflicts. In some embodiments, priority metadata may be gleaned from previous meetings. For example, calendar/scheduling logic 104A/106A and 104B/106B configured for each of user device 102A/102B and/or cloud scheduling service 130 can analyze metadata, statistics, information, and/or the like from past meetings to determine certain meetings in which a given user 101A/101B may be a presenter, to determine an importance of a given meeting, to determine a user role for a given meeting, to determine meeting type(s), etc.

The priority metadata helps share the type of interaction that the people will have on their meetings and help schedule which user should use a shared resource. For example, is a meeting a 'speaking'/'presenting' or 'listening' meeting, is the person a presenter or an audience member, among others.

Thus, an employee can mark a meeting with priority metadata indicating how they intend or predict they will be interacting in the meeting. For example, a user could set a meeting as 'Presenting', meaning that the user will be 'on-stage' in the meeting presenting to an audience. Alternatively, a user can specify 'limited talking' (meaning they predict they will need to do little speaking, or just asking/answering questions) and finally, the user can specify 'Listening' (meaning they will be only a consume of info, during an all-hands broadcast for example).

Based on the priority metadata provided for shared calendar information, a shared resource can be assigned for user by a given user for a given meeting. For example, in at least one embodiment, logic configured for system 100 (e.g., calendar/scheduling logic 104A/106A and 104B/106B and/or cloud scheduling service 130) can identify, based on shared masked calendar information, a conflict involving use of a shared resource, such as shared resource 120, at a particular by multiple users, such as by user 101A and 101B. Upon identifying a conflict involving use of the shared resource for a particular time (or a particular period of time or partially overlapping period of time), the logic can compare the priority metadata associated with each meeting for each user in order to whether a given user has the highest priority for use of the shared resource for a given meeting and, thus, is to be assigned the use the shared resource.

Different types of priority metadata provided for each meeting can be assigned different values to determine according to a prioritization algorithm whether a given user 101A or 101B has the highest priority for use of the shared resource 120. The values for different metadata provided for a meeting can be combined (e.g., summed together, summed together in a weighted manner, etc.) in order to algorithmically determine based on a comparison of the values determined for each of user 101A and 101B whether a given user 101A or 101B has the highest priority for use of the shared resource 120 according to the prioritization algorithm.

In one example, priority metadata indicating video will be used during a meeting can be assigned a higher weight value than a weight value assigned to priority metadata indicating that a meeting is an audio-only meeting. In another example, priority metadata indicating that a user will be presenting during a meeting can be assigned a higher weight value as compared to weight values assigned to priority metadata indicating that a user is not presenting, is listening only, or not utilizing video. Other weighting variations can be envisioned.

Thus, using priority metadata for identified conflicts (involving use of a shared resource), allows for a comparison between priority metadata for a user 101A meeting and a user 101B meeting that involves use of the shared resource 120 at the same time (or overlapping times) can be performed to determine whether user 101A or user 101B has the highest priority for their given meeting involving the shared resource 120.

For example, if both user 101A and user 101B have a 'presenting' meeting that involves use of the shared resource 120 at a given time/overlapping time, then only one of the users should be assigned the use of the shared resource 120. Consider, in one example, that calendar/scheduling logic 104A/106A and 104B/106B identify a conflict between user 101A and 101B involving use of shared resource 120 (e.g., shared meeting space at [LOC 120] between 9 AM and 11 AM for meeting 112.1A for user 101A and meeting 112.1B for user 101B based on the masked calendar information 110A/110B shared between user device 102A and 102B. The priority metadata 114.1A indicates that user 101A is presenting during the meeting 112.1A and the priority metadata 114.1B indicates that user 101B is also presenting during the meeting 112.1A; thus, both users 101A and 101B need to use the shared resource 120 at the same time and both expect to be presenting during their use of the shared resource 120.

In one instance, the 'importance' of a meeting can be identified in priority metadata provided for each meeting, such that users 101A and 101B can mark meetings with an importance level, as shown in FIG. 1A. For example, an important presentation to a Vice President might have much greater importance than a mentoring meeting with a co-worker. However, other priority metadata can be used to determine the importance of a meeting such that the culmination of priority metadata provided for a meeting can be used to resolve conflicts. By tagging meetings with priority metadata, logic configured for system 100 can automatically resolve the shared resource 120 (e.g., shared meeting space) conflict and prioritize the user with the higher priority meeting.

Thus, if both people are attending a 'presenting' meeting then the meeting with the highest importance can, in one instance, be assigned the use of a shared meeting space. Considering the present example involving use of the shared resource by user 101A and 101B, it can be determined that user 101A has the highest priority for the use of the shared resource 120 between 9 AM and 11 AM and, thus, can be assigned to use the shared resource 120. FIG. 1B illustrates a shared resource assignment schedule 114 identifying the assignment of the shared resource 120 to user 101A for the meeting between 9 AM and 11 AM in which the "winner" of the office for the specific timeslot via the shared resource assignment schedule 114.

In another example, for a conflict between user 101A and 101B that is identified involving use of the shared resource 120 (e.g., shared meeting space at [LOC 120] between 1 PM and 3 PM for meeting 112.3A for user 101A and meeting 112.2B for user 101B based on the masked calendar information 110A/110B shared between user device 102A and 102B, the priority metadata 112.2B indicates that user 101B will be presenting during the meeting 112.2B and that user 101A will not be presenting during meeting 112.3A. Thus, in this example, user 101B can be assigned the use of the shared resource 120, as shown via the shared resource assignment schedule 114 in FIG. 1B.

Thus, when conflicts are detected users 101A and 101B can be immediately notified. In some instances, the system may try to relocate the user that is not assigned to use the shared resource or may try to re-schedule the meeting that is determined to be the lower priority meeting.

In yet another example, no conflict between user 101A and 101B may be identified for use of the shared resource 120 (e.g., shared meeting space at [LOC 120] between 11 AM and 1 PM such that use of the shared resource 120 can be assigned to user 101A. However, it is to be understood that user 101B may still be capable of using the shared meeting space since user 101A is not presenting during the meeting.

It is to be understood that the shared resource assignment schedule 114, as shown in FIG. 1B, is provided for illustrative purposes only in order to illustrate various shared resource assignment details that may be associated with embodiments herein and is not meant to limit the broad scope of embodiments herein. In some instances, the shared resource assignment schedule 114 could be displayed within a user interface displayed via each user device 102A/102B or an assignment indication identifying who has been assigned the use of the shared resource 120 could be provided for each meeting identified for each user's calendar. Other variations for identifying the assignment of a shared resource (or task, as discussed below) to a given user via a corresponding user device can be envisioned and, thus, are clearly within the scope of embodiments herein.

In some instances, only one user may be assigned to use a shared resource, however, in some instances both users may be assigned to use the shared resource for certain scenarios/meetings.

For example, it may be possible in some scenarios for neither user 101A nor user 101B to be determined to have the highest priority for a given meeting, such that meetings involving overlapping use of shared resource 120 may have equal priority or may include priority metadata indicating that only one user need not solely utilize the shared resource 120. For example, if it is determined that user 101A and user 101B have overlapping meetings for a particular time/period of time involving shared resource 120, but at least one of the users is attending 'listening', 'non-presenter', or 'non-video' meetings, then both user 101A and user 101B can be assigned to use the shared resource 120 at the same time.

Thus, in some scenarios, two people can attend meetings and both be assigned use of the shared resource 120 at the same time if one person is presenting and the person is not. However, if the other person has a 'limited talking' meeting than this is not ideal, and a warning could be issued to the users in one embodiment via the users' corresponding user devices (e.g., a warning message, a calendar indication, etc.). Still, in one embodiment, if both user 101A and 101B have 'limited talking' meetings, then the probability of speaking overlap is likely minimal such that both users 101A and 101B may be assigned to use the shared resource 120, and a warning could still be issued to the users.

In some embodiments for instances in which it is determined that users 101A and 101B have equal priority/equal weight meetings, the logic can assign the shared resource 120 based on previous assignments of the shared resource. For example, in one embodiment, the logic may consider if a user was already attending a meeting in a shared meeting space just prior to a conflict and, if so, the previously attending user could be assigned the use of the shared meeting space so that they may stay in their seat to minimize disruption. In another embodiment, if there is no meeting occurring for either user involving the shared meeting space just prior to the conflict, then the shared meeting space could be assigned based on which user had not had access to the shared meeting space recently.

Figure 2:
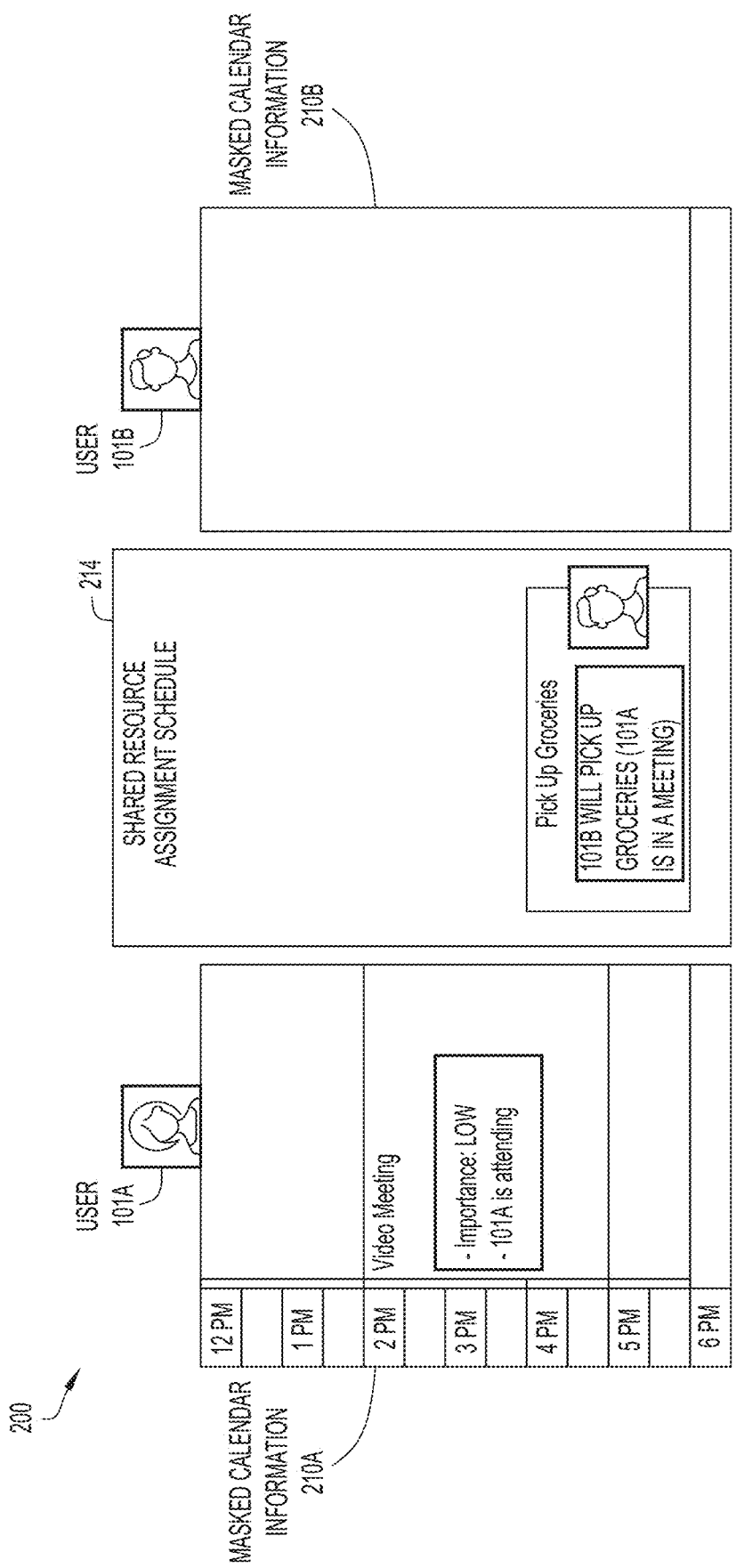
FIG. 2 is a diagram illustrating example details associated with providing proactive scheduling between at least two users in order to assign a shared task to one of the users, according to an embodiment.

Maintaining a history involving the use of a shared resource by the logic (e.g., calendar/scheduling logic 104A/106A and 104B/106B and/or cloud scheduling service 130) could provide for various 'fairness' mechanisms to be provided via system 100. For example, in some instances, even if a given user 101A/101B is determined to have the highest priority for a meeting over the other user 101A/101B involving use of the shared resource 120, the logic can determine whether the given user having the highest priority has 'won' the assignment of the shared resource a consecutive threshold number of times such that, if the consecutive threshold number of times is determined, the shared resource can be assigned to the other (lower priority) user (that has not previously used the shared resource 120 the consecutive threshold number of time) in order to help avoid one user 'hogging' use of the shared resource 120. Similar logic could be utilized upon determining that the users have equal priority/equal weight meetings in that, upon determining equal priority/equal weight meetings among multiple users involving a same shared meeting space, the shared meeting space could be assigned to a user that has not previously used/been assigned the shared meeting space a consecutive threshold number of times. Thus, user usage of a given shared resource can also be weighted in accordance with embodiments herein Referring to FIG. 2, FIG. 2 is a diagram 200 illustrating example details associated with providing proactive scheduling between at least two users in order to assign a shared task to one of the users, according to an embodiment. As noted above, techniques herein may also provide proactive scheduling across calendars for shared responsibilities or tasks.

Since techniques herein provide for ability to share different calendars and the ability to resolve conflicts for a shared resource among multiple potential users of the shared resource (e.g., for room contention) based on a prioritization algorithm, such techniques can easily be extended to provide a solution to another common problem—assigning a shared responsibility or task to a particular person when the task can be performed by multiple people.

For example, very often in a home co-working space, two adults work at different companies but also have overlapping home responsibilities (e.g., picking up the kids from school, groceries, elder care, etc.). In such scenarios, calendars have to be manually reconciled by the individuals, which may not be proactive in ensuring that one of the members of the household schedules time for the task. This problem is similar to the shared room resource conflict discussed for embodiments above, but in this case, there is a task that must be completed by one or more of the household members at a certain time.

Using the local proximity calendar sharing techniques, as discussed above, embodiments herein may facilitate a new task type that can be created, which is referred to herein as a shared responsibility or task (meeting) type. This shared responsibility has context to the shared work environment (e.g., a home or shared living space) and the people that live in it in that the shared work or task must be completed by the people that share the space, and often that task is to be performed during 'business hours', which can complicate scheduling.

These events have specific details (ex: "pick up Blake from school at 5 PM") that are only visible to the people that share the same local proximity and, if accepted, are shown as busy time on the corporate calendars, and in this way the corporate context knows not to schedule meetings during this time In some embodiments, the logic (e.g., calendar/scheduling logic 104A/106A and 104B/106B and/or cloud scheduling service 130) can proactively assign a shared responsibility or task to a member of the household who is free at a given time (e.g., not in a work meeting, based on their corporate calendar) and/or allow conflict resolution schedule operations to be performed such that a particular person is selected/assigned to perform a given task based on which user 101A or 101B has the lesser priority meeting at that time, or allow the members to manually accept/decline the responsibility for that day. Once assigned or accepted by one party, the activity becomes 'free' time on all other parties' corporate calendars.

For example, as shown in FIG. 2, a shared task assignment schedule 214 is illustrated along with (shared) masked calendar information 210A for user 101A and masked calendar information 210B for user 101B. In this example, user 101B is assigned the shared responsibility of "Pick up Groceries" since user 101A is scheduled to attend a meeting during that time window. It is to be understood that the example illustrated in FIG. 2 is provided for illustrative purposes only and is not meant to limit the broad scope of embodiments herein. For example, in one scenario if one user is scheduled for a meeting but the meeting is audio only while another user is in a video meeting, then the user that is in the audio only meeting could potentially be assigned a shared task. In some scenarios, shared tasks could be marked with multiple potential users assigned to a task such that one of the users can elect to perform the task. Thus, other variations for shared task assignments can be envisioned in accordance with embodiments herein.

Figure 3:
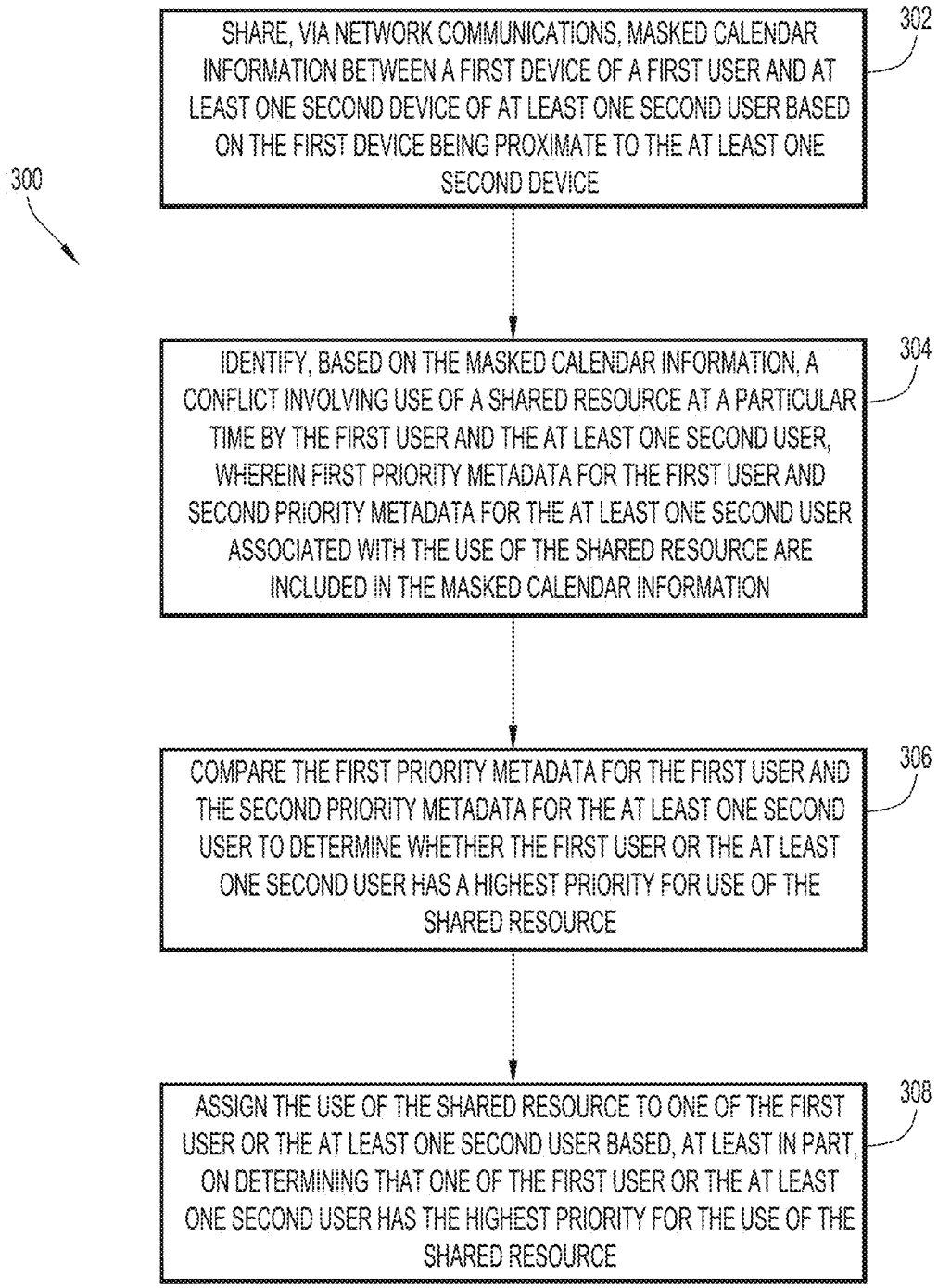
FIG. 3 is a flow chart depicting a method according to an example embodiment.

Referring to FIG. 3, FIG. 3 is a flow chart depicting a method 300 according to an example embodiment. In at least one embodiment, operations associated with method 300 may be performed, at least in part, by any of calendar/scheduling logic 104A/106A and 104B/106B and/or cloud scheduling service 130, as discussed for embodiments herein.

At 302, the method may include sharing, via network communications, masked calendar information between a first device of a first user (e.g., user device 102A of user 101A) and at least one second device of at least one second user (e.g., user device 102B of user 101B) based on the first device being proximate to the at least one second device. At 304, the method may include identifying, based on the masked calendar information, a conflict involving use of a shared resource (e.g., a shared meeting space) at a particular time by the first user and the at least one second user, wherein first priority metadata for the first user and second priority metadata for the at least one second user associated with the use of the shared resource are included in the masked calendar information.

At 306, the method may include comparing the first priority metadata for the first user and the second priority metadata for the at least one second user to determine whether the first user or the at least one second user has a highest priority for use of the shared resource. The first priority metadata and the second priority metadata can include different types of metadata that are assigned different weight values. In one instance, a higher weight value is assigned to metadata indicating that a particular user will be utilizing video for a meeting involving the shared resource, as compared to a lower weight value that could be assigned to metadata indicating that a meeting is an audio only meeting involving the shared resource. In one instance, a higher weight value is assigned to metadata indicating that a particular user will be speaking or presenting for a meeting involving the resource, as compared to a lower weight value that could be assigned to metadata indicating that a user is not presenting or not speaking for a meeting involving the shared resource. Thus, a lower weight value can be assigned to metadata indicating that a particular user will be listening, not presenting, or not utilizing video for a meeting involving the shared resource.

At 308, the method may include assigning the use of the shared resource to one of the first user or the at least one second user based, at least in part, on determining that one of the first user or the at least one second user has the highest priority for the use of the shared resource.

In some embodiments, although not shown in FIG. 3, the method may include, upon determining the highest priority for the use of the shared resource, determining that the first user or the at least one second user has previously used the shared resource a consecutive threshold number of times, wherein the assigning includes assigning the first user or the at least one second user to use the shared resource that has not previously used the shared resource the consecutive threshold number of times. In still some embodiments, the method may include, based on determining that neither the first user nor the at least one second user have the highest priority for use of the shared resource and that each of the first user and the at least one second user will be listening, not presenting, or not utilizing video for the use of the shared resource, assigning the use of the shared resource to both of the first user and the at least one second user.

In still some embodiments, the method may include determining, based on the masked calendar information, a conflict involving a task that is to be performed at a particular time by one of the first user and the at least one second user, and assigning one of the first user or the at least one second user to perform the task based on the first user or the second user having lower priority metadata for use of the shared resource or based on the first user or the at least one second user not having a conflict at the particular time.

Figure 4:
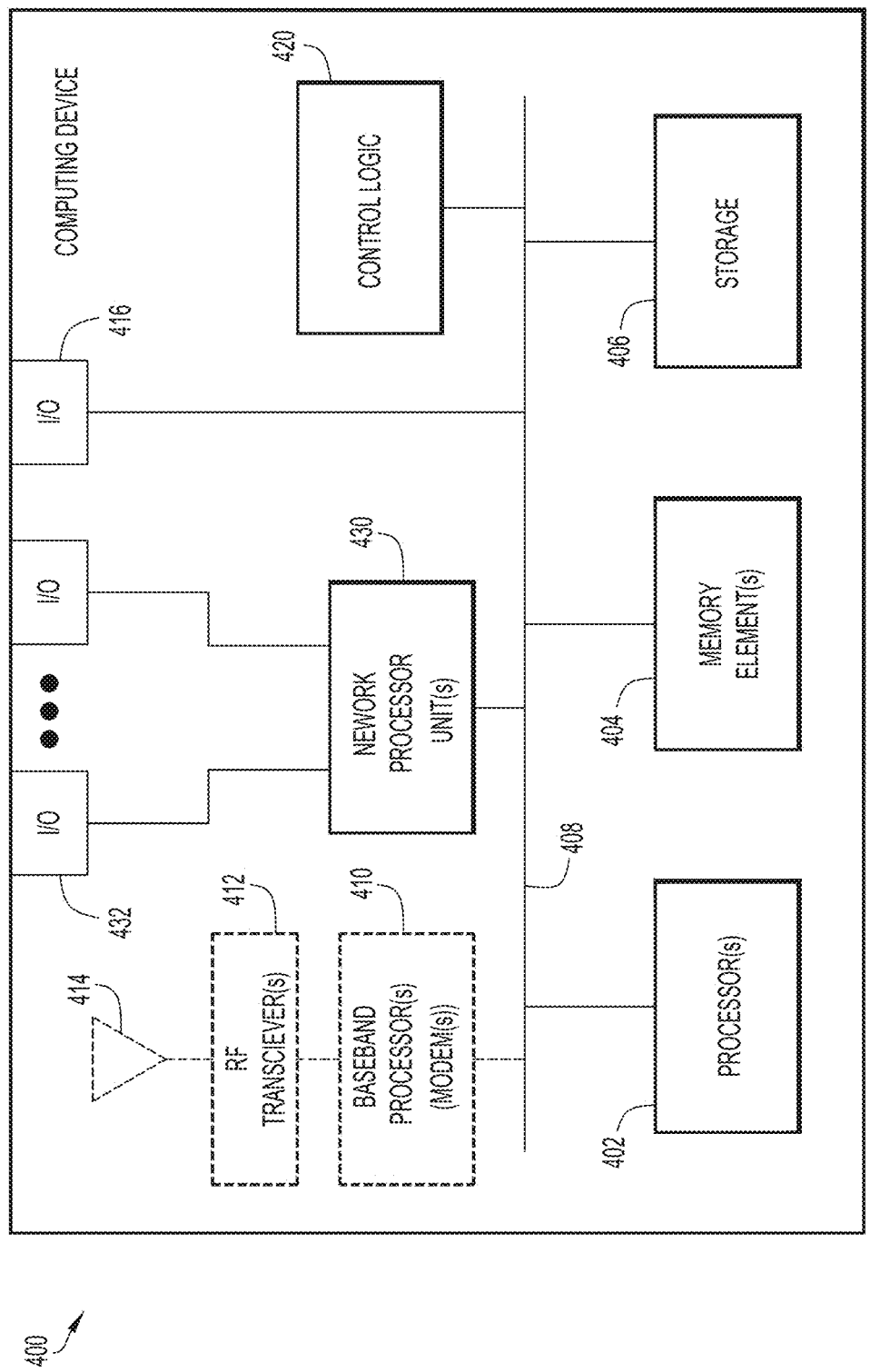
FIG. 4 is a hardware block diagram of a computing device that may perform functions associated with any combination of operations, in connection with the techniques discussed herein.

Referring to FIG. 4, FIG. 4 illustrates a hardware block diagram of a computing device 400 that may perform functions associated with operations discussed herein. In various embodiments, a computing device or apparatus, such as computing device 400 or any combination of computing devices 400, may be configured as any entity/entities as discussed herein (e.g., user device 102A, user device 102B, and cloud scheduling service 130) in order to perform operations of the various techniques discussed herein.

In at least one embodiment, computing device 400 may be any apparatus that may include one or more processor(s)

402, one or more memory element(s) 404, storage 406, a bus 408, one or more I/O interface(s) 416, control logic 420 (e.g., calendar logic/scheduling logic, as discussed herein), one or more one network processor unit(s) 430 and one or more network I/O interface(s) 432. In various embodiments, instructions associated with logic for computing device 400 can overlap in any manner and are not limited to the specific allocation of instructions and/or operations described herein.

For embodiments in which computing device 400 may be implemented as a user device (e.g., user device 102A or user device 102B) or any other device capable of wireless communications (e.g., cloud scheduling service 130), computing device 400 may further include at least one baseband processor or modem 410, one or more radio RF transceiver(s) 412, one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa) or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that are configured for computing device 400. In at least one embodiment, bus 408 is implemented as a fast kernel-hosted interconnect, potentially using shared memory between processes (e.g., logic), which can enable efficient communication paths between the processes.

Network processor unit(s) 430 may enable communication between computing device 400 and other systems, devices, or entities, via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 400 and other systems, devices, or entities to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that are connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 400 supports a display having touch-screen display capabilities.

For embodiments in which computing device 400 is implemented as a user device or any other apparatus capable of wireless communications, the RF transceiver(s) 412 may perform RF transmission and RF reception of wireless signals via antenna(s)/antenna array(s) 414, and the baseband processor or modem 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device 400; interacting with other entities, elements, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420 of computing device 400) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) (e.g., memory element(s) 404 of computing device 400) and/or storage (e.g., storage 406 of computing device 400) can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include sharing, via network communications, masked calendar information between a first device of a first user and at least one second device of at least one second user based on the first device being proximate to the at least one second device; identifying, based on the masked calendar information, a conflict involving use of a shared resource at a particular time by the first user and the at least one second user, wherein first priority metadata for the first user and second priority metadata for the at least one second user associated with the use of the shared resource are included in the masked calendar information; comparing the first priority metadata for the first user and the second priority metadata for the at least one second user to determine whether the first user or the at least one second user has a highest priority for use of the shared resource; and assigning the use of the shared resource to one of the first user or the at least one second user based, at least in part, on determining that one of the first user or the at least one second user has the highest priority for the use of the shared resource.

In one instance, upon determining the highest priority for the use of the shared resource, the method further includes determining that the first user or the at least one second user has previously used the shared resource a consecutive threshold number of times, wherein the assigning includes assigning the first user or the at least one second user to use the shared resource that has not previously used the shared resource the consecutive threshold number of times.

In one instance, the shared resource is a shared meeting space. In one instance, the first priority metadata and the second priority metadata include different types of metadata that are assigned weight values. In one instance, a higher weight value is assigned to a type of metadata indicating that a particular user will be utilizing video for a meeting involving the shared meeting space. In one instance, a higher weight value is assigned to a type of metadata indicating that a particular user will be speaking or presenting for a meeting involving the shared meeting space. In one instance, a lower weight value is assigned to a type of metadata indicating that a particular user will be listening, not presenting, or not utilizing video for a meeting involving the shared meeting space.

In one instance, based on determining that neither the first user nor the at least one second user have the highest priority for use of the shared resource and that each of the first user and the at least one second user will be listening, not presenting, or not utilizing video for the use of the shared resource, the assigning includes assigning the use of the shared resource to both of the first user and the at least one second user.

In one instance, the method may further include determining a conflict involving a task that is to be performed at a particular time by one of the first user and the at least one second user; and assigning one of the first user or the at least one second user to perform the task based on the first user or the second user having lower priority metadata for use of the shared resource or based on the first user or the at least one second user not having a conflict at the particular time.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   identifying, by a first device of a first user that at least one second user of at least one second device is included in a list of second users with which first masked calendar information associated with the first user is allowed to be shared;
   identifying, by the at least one second device of the at least one second user, that the first user of the first device is included in a list of first users with which second masked calendar information associated with the at least one second user is allowed to be shared;
   based on the identifying by the first device and the at least one second device, sharing, via at least one peer-to-peer communication exchange between a first device of a first user and at least one second device of at least one second user, masked calendar information between the first device of the first user and the at least one second device of the at least one second user based on the first device being in ultrasonic or near field communication (NFC) wireless communication proximity with the at least one second device, wherein the at least one peer-to-peer communication exchange includes the first device transmitting via an ultrasonic or an NFC wireless communication, to the at least one second device, the first masked calendar information that includes first priority metadata indicating an intended use of a shared resource by the first user and includes the at least one second device transmitting via an ultrasonic or an NFC wireless communication, to the first device, the second masked calendar information that includes second priority metadata indicating an intended use of the shared resource by the at least one second user included in the masked calendar information;

identifying, based on the first masked calendar information and the second masked calendar information, a conflict involving use of the shared resource at a particular time by the first user and the at least one second user;

comparing the first priority metadata for the first user and the second priority metadata for the at least one second user to determine whether the first user or the at least one second user has a highest priority for use of the shared resource; and assigning the use of the shared resource to one of the first user or the at least one second user based, at least in part, on determining that one of the first user or the at least one second user has the highest priority for the use of the shared resource.

2. The method of claim 1, wherein upon determining the highest priority for the use of the shared resource, the method further comprises:

determining that the first user or the at least one second user has previously used the shared resource a consecutive threshold number of times, wherein the assigning includes assigning the first user or the at least one second user to use the shared resource that has not previously used the shared resource the consecutive threshold number of times.

3. The method of claim 1, wherein the shared resource is a shared meeting space.

4. The method of claim 3, wherein the first priority metadata and the second priority metadata include different types of metadata that are assigned weight values.

5. The method of claim 4, wherein a higher weight value is assigned to a type of metadata indicating that a particular user will be utilizing video for a meeting involving the shared meeting space.

6. The method of claim 4, wherein a higher weight value is assigned to a type of metadata indicating that a particular user will be speaking or presenting for a meeting involving the shared meeting space.

7. The method of claim 4, wherein a lower weight value is assigned to a type of metadata indicating that a particular user will be listening, not presenting, or not utilizing video for a meeting involving the shared meeting space.

8. The method of claim 1, wherein based on determining that neither the first user nor the at least one second user have the highest priority for use of the shared resource and that each of the first user and the at least one second user will be listening, not presenting, or not utilizing video for the use of the shared resource, the assigning includes assigning the use of the shared resource to both of the first user and the at least one second user.

9. The method of claim 1, further comprising:

determining a conflict involving a task that is to be performed at a particular time by one of the first user and the at least one second user; and assigning one of the first user or the at least one second user to perform the task based on the first user or the at least one second user having lower priority metadata for use of the shared resource or based on the first user or the at least one second user not having a conflict at the particular time.

10. One or more non-transitory computer readable storage media encoded with instructions that, when executed by a processor, cause the processor to perform operations, comprising:

identifying, by a first device of a first user that at least one second user of at least one second device is included in a list of second users with which first masked calendar information associated with the first user is allowed to be shared;

identifying, by the at least one second device of the at least one second user, that the first user of the first device is included in a list of first users with which second masked calendar information associated with the at least one second user is allowed to be shared;

based on the identifying by the first device and the at least one second device, sharing, via at least one peer-to-peer communication exchange between a first device of a first user and at least one second device of at least one second user, masked calendar information between the first device of the first user and the at least one second device of the at least one second user based on the first device being in ultrasonic or near field communication (NFC) wireless communication proximity with the at least one second device, wherein the at least one peer-to-peer communication exchange includes the first device transmitting via an ultrasonic or an NFC wireless communication, to the at least one second device, the first masked calendar information that includes first priority metadata indicating an intended use of a shared resource by the first user and includes the at least one second device transmitting via an ultrasonic or a NFC wireless communication, to the first device, the second masked calendar information that includes second priority metadata indicating an intended use of the shared resource by the at least one second user included in the masked calendar information;

identifying, based on the first masked calendar information and the second masked calendar information, a conflict involving use of shared resource at a particular time by the first user and the at least one second user;

comparing the first priority metadata for the first user and the second priority metadata for the at least one second user to determine whether the first user or the at least one second user has a highest priority for use of the shared resource; and assigning the use of the shared resource to one of the first user or the at least one second user based, at least in part, on determining that one of the first user or the at least one second user has the highest priority for the use of the shared resource.

11. The media of claim 10, wherein upon determining the highest priority for the use of the shared resource, the instructions, when executed by the processor, cause the processor to perform further operations, comprising:

determining that the first user or the at least one second user has previously used the shared resource a consecutive threshold number of times, wherein the assigning includes assigning the first user or the at least one second user to use the shared resource that has not previously used the shared resource the consecutive threshold number of times.

12. The media of claim 10, wherein the shared resource is a shared meeting space and wherein the first priority metadata and the second priority metadata include different types of metadata that are assigned weight values.

13. The media of claim 12, wherein at least one of:
a higher weight value is assigned to a type of metadata indicating that a particular user will be utilizing video for a meeting involving the shared meeting space;
a higher weight value is assigned to a type of metadata indicating that a particular user will be speaking or presenting for a meeting involving the shared meeting space; and
a lower weight value is assigned to a type of metadata indicating that a particular user will be listening, not presenting, or not utilizing video for a meeting involving the shared meeting space.

14. The media of claim 10, wherein based on determining that neither the first user nor the at least one second user have the highest priority for use of the shared resource and that each of the first user and the at least one second user will be listening, not presenting, or not utilizing video for the use of the shared resource, the assigning includes assigning the use of the shared resource to both of the first user and the at least one second user.

15. The media of claim 10, further comprising instructions that, when executed by the processor, cause the processor to perform further operations, comprising:
determining a conflict involving a task that is to be performed at a particular time by one of the first user and the at least one second user; and
assigning one of the first user or the at least one second user to perform the task based on the first user or the at least one second user having lower priority metadata for use of the shared resource or based on the first user or the at least one second user not having a conflict at the particular time.

16. A system comprising:
at least one memory element for storing data; and
at least one processor for executing instructions associated with the data, wherein executing the instructions causes the system to perform operations, comprising:
identifying, by a first device of a first user that at least one second user of at least one second device is included in a list of second users with which first masked calendar information associated with the first user is allowed to be shared;
identifying, by the at least one second device of the at least one second user, that the first user of the first device is included in a list of first users with which second masked calendar information associated with the at least one second user is allowed to be shared;
based on the identifying by the first device and the at least one second device, sharing, via at least one peer-to-peer communication exchange between a first device of a first user and at least one second device of at least one second user, masked calendar information between the first device of the first user and the at least one second device of the at least one second user based on the first device being in ultrasonic or near field communication (NFC) wireless communication proximity with the at least one second device, wherein the at least one peer-to-peer communication exchange includes the first device transmitting via an ultrasonic or a near field communication (NFC) wireless communication, to the at least one second device, the first masked calendar information that includes first priority metadata indicating an intended use of a shared resource by the first user and includes the at least one second device transmitting via an ultrasonic or an NFC wireless communication, to the first device, the second masked calendar information that includes second priority metadata indicating an intended use of the shared resource by the at least one second user included in the masked calendar information;
identifying, based on the first masked calendar information and the second masked calendar information, a conflict involving use of shared resource at a particular time by the first user and the at least one second user;
comparing the first priority metadata for the first user and the second priority metadata for the at least one second user to determine whether the first user or the at least one second user has a highest priority for use of the shared resource; and
assigning the use of the shared resource to one of the first user or the at least one second user based, at least in part, on determining that one of the first user or the at least one second user has the highest priority for the use of the shared resource.

17. The system of claim 16, wherein upon determining the highest priority for the use of the shared resource, executing the instructions causes the system to perform further operations, comprising:
determining that the first user or the at least one second user has previously used the shared resource a consecutive threshold number of times, wherein the assigning includes assigning the first user or the at least one second user to use the shared resource that has not previously used the shared resource the consecutive threshold number of times.

18. The system of claim 16, wherein the shared resource is a shared meeting space and wherein the first priority metadata and the second priority metadata include different types of metadata that are assigned weight values.

19. The system of claim 18, wherein at least one of:
a higher weight value is assigned to a type of metadata indicating that a particular user will be utilizing video for a meeting involving the shared meeting space;
a higher weight value is assigned to a type of metadata indicating that a particular user will be speaking or presenting for a meeting involving the shared meeting space; and
a lower weight value is assigned to type of metadata indicating that a particular user will be listening, not presenting, or not utilizing video for a meeting involving the shared meeting space.

20. The system of claim 16, wherein based on determining that neither the first user nor the at least one second user have the highest priority for use of the shared resource and that each of the first user and the at least one second user will be listening, not presenting, or not utilizing video for the use of the shared resource, the assigning includes assigning the use of the shared resource to both of the first user and the at least one second user.

* * * * *